United States Patent
Nochi et al.

(10) Patent No.: US 8,410,013 B2
(45) Date of Patent: Apr. 2, 2013

(54) CATALYST FOR TREATING EXHAUST GAS

(75) Inventors: Katsumi Nochi, Hiroshima (JP);
Yoshiaki Obayashi, Hiroshimia (JP);
Masashi Kiyosawa, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 329 days.

(21) Appl. No.: 12/670,420

(22) PCT Filed: Feb. 26, 2009

(86) PCT No.: PCT/JP2009/053573
§ 371 (c)(1),
(2), (4) Date: Apr. 28, 2010

(87) PCT Pub. No.: WO2009/107729
PCT Pub. Date: Sep. 3, 2009

(65) Prior Publication Data
US 2010/0210455 A1 Aug. 19, 2010

(30) Foreign Application Priority Data
Feb. 27, 2008 (JP) .................. 2008-045818

(51) Int. Cl.
| B01J 8/02 | (2006.01) |
| B01J 27/00 | (2006.01) |
| B01J 27/198 | (2006.01) |
| B01J 27/188 | (2006.01) |
| B01J 27/19 | (2006.01) |
| B01J 27/192 | (2006.01) |
| B01J 23/00 | (2006.01) |
| C01G 11/00 | (2006.01) |
| C01G 13/00 | (2006.01) |
| C01G 28/00 | (2006.01) |
| C01G 30/00 | (2006.01) |
| B32B 3/12 | (2006.01) |
| C22B 17/00 | (2006.01) |
| C22B 19/00 | (2006.01) |
| C22B 19/04 | (2006.01) |
| C22B 43/00 | (2006.01) |
| B01D 53/56 | (2006.01) |
| B01D 53/94 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |

(52) U.S. Cl. ......... 502/208; 502/209; 502/210; 502/211; 502/212; 423/99; 423/107; 423/213.2; 423/239.1; 428/116

(58) Field of Classification Search .......... 502/208–212, 502/312, 350; 423/99, 107, 213.2, 239.1; 264/630; 428/116
See application file for complete search history.

(56) References Cited

U.S. PATENT DOCUMENTS
4,085,122 A 4/1978 Stefani et al.
(Continued)

FOREIGN PATENT DOCUMENTS
CA 2676953 A1 8/2008
(Continued)

OTHER PUBLICATIONS
Translation of Written Opinion for PCT/JP2009/053573.*
(Continued)

*Primary Examiner* — Patricia L Hailey
(74) *Attorney, Agent, or Firm* — Westerman, Hattori, Daniels & Adrian, LLP

(57) ABSTRACT

Provided is a catalyst for treating exhaust gas capable of reducing the amount of a highly corrosive mercury-chlorinating agent to be added while keeping the mercury oxidation efficiency high in an exhaust gas treatment. By the catalyst for treating exhaust gas, nitrogen oxide in the exhaust gas is removed upon contact with ammonia serving as a reducing agent, and mercury is oxidized using a halogen serving as an oxidant. The catalyst includes: $TiO_2$ as a support; an oxide of at least one selected from the group consisting of V, W and Mo, which is supported as an active component on the support; and at least one selected from the group consisting of Bi, P, and compounds containing Bi and/or P, which is supported as a co-catalyst component on the support.

4 Claims, 2 Drawing Sheets

U.S. PATENT DOCUMENTS

| | | | |
|---|---|---|---|
| 4,100,106 | A | 7/1978 | Stefani et al. |
| 4,324,694 | A | 4/1982 | Reuter et al. |
| 4,466,947 | A | 8/1984 | Imanari et al. |
| 4,537,874 | A | 8/1985 | Sato et al. |
| 6,458,970 | B1 | 10/2002 | Hefele et al. |
| 6,638,485 | B1 | 10/2003 | Iida et al. |
| 2007/0140939 | A1 | 6/2007 | Obayashi et al. |
| 2007/0149391 | A1* | 6/2007 | Yeung et al. ............. 502/232 |
| 2010/0183492 | A1* | 7/2010 | Kato et al. ............. 423/239.1 |
| 2011/0250114 | A1* | 10/2011 | Augustine et al. ......... 423/239.1 |

FOREIGN PATENT DOCUMENTS

| | | | |
|---|---|---|---|
| CA | 2692308 | A1 | 12/2008 |
| CA | 2672541 | A1 | 3/2009 |
| CN | 1248929 | A | 3/2000 |
| JP | 56-168835 | A | 12/1981 |
| JP | 59-213442 | A | 12/1984 |
| JP | 10-230137 | A | 9/1998 |
| JP | 2005-342711 | * | 12/2005 |
| JP | 2007-167698 | A | 7/2007 |
| JP | 2009-006226 | A | 1/2009 |

OTHER PUBLICATIONS

Indian Office Action dated Mar. 2, 2012, issued in corresponding Indian Patent Application No. 324/MUMNP/2010.

International Search Report of PCT/JP2009/053573, mailing date of May 26, 2009.

Canadian Notice of Allowance dated Jun. 6, 2012, issued in corresponding Canadian Patent Application No. 2,694,632.

Canadian Office Action dated Aug. 16, 2011, issued in corresponding Canadian Patent Application No. 2,694,632.

A. Spojakina et al.; "TiO2-supported iron-molybdenum hydrodesulfurization catalysts"; Applied Catalysis, vol. 288, May 31, 2005, pp. 10-17, XP002655316.(cited in Supplementary European Search Repord dated Aug. 11, 2011).

A. J. Van Hengstum et al.; "Selective Gas Phase Oxidation of Toluene by Vanadium Oxide/TiO2 Catalysts", Applied Catalysis, vol. 8, Dec. 31, 1983, pp. 369-382, XP002655314.(cited in Supplementary European Search Report dated Aug. 11, 2011).

E. Kraleva et al.; "Support effect on the properties of iron-molybdenum hydrodesulfurization catalysts"; Catalysis Letters, vol. 112, No. 3-4, Dec. 31, 2006, pp. 203-212, XP002655315.(cited in Supplementary European Search Report dated Aug. 11, 2011).

Supplementary European Search Report dated Aug. 11, 2011, issued in corresponding European Patent Application No. 09714242.6.

Chinese Office Action dated Oct. 9, 2012, issued in corresponding Chinese Patent Application No. 200980100196.9, (15 pages). With English Translation.

Notice of Allowance dated Aug. 20, 2012, issued in corresponding Korean Patent Application No. 10-2010-7003692 (2 pages) w/concise explanation.

Japanese Office Action dated Dec. 7, 2012, issued in corresponding Japanese Patent Application No. 2008-045818, with English translation (4 pages).

\* cited by examiner

CATALYST FOR TREATING EXHAUST GAS

TECHNICAL FIELD

The present invention relates to a catalyst for treating exhaust gas having a denitration activity and a mercury oxidation activity.

BACKGROUND ART

Among methods for treating exhaust gas in which $NO_x$ is removed from exhaust gas in a reduction denitration unit and then $SO_2$ is removed in a wet desulfurization unit using an alkaline absorbing solution as an absorbent, there has been studied a method for treating metallic mercury and a mercury compound (hereinafter, collectively referred to as mercury, unless otherwise stated) in exhaust gas while performing denitration and desulfurization at the same time.

Mercury in flue gas exists in forms of metallic mercury which is insoluble in water and mercury chloride which is soluble in water. When in the form of metallic mercury, mercury is hardly dissolved in water. When mercury is in the metallic form, the efficiency of removing mercury by a wet desulfurization unit is lowered. Meanwhile, when mercury is in the form of HgCl or $HgCl_2$, HgCl or $HgCl_2$ in exhaust gas is dissolved in water through the gas-liquid contact in the wet desulfurization unit, and thereby mercury can be removed. In other words, if metallic mercury can be converted into mercury chloride in the presence of a catalyst such as a denitration catalyst, mercury can be removed in the desulfurization unit located in the downstream.

An example of such a conventional method for treating exhaust gas utilizing this scheme will be described with reference to FIG. 2. In FIG. 2, a $NH_3$ supply spot 20 and a supply spot 21 are provided in a flow path from a boiler 10 to a reduction denitration unit 60. At the $NH_3$ supply spot 20, $NH_3$ supplied from a $NH_3$ tank 30 is injected into exhaust gas. At the supply spot 21, a mercury-chlorinating agent such as HCl is injected into the exhaust gas from a tank 40 for supplying the mercury-chlorinating agent. The exhaust gas from the boiler 10 is introduced into the reduction denitration unit 60. In the reduction denitration unit 60, $NH_3$ and $NO_x$ in the exhaust gas into which $NH_3$ and HCl are injected react with each other, and simultaneously metallic Hg is oxidized to $HgCl_2$ in the presence of HCl. After passing through an air heater 70 and a heat exchanger 80, the soot and dust are removed in a dust collector 90. Then, $SO_2$ and $HgCl_2$ in the exhaust gas are simultaneously removed in a wet desulfurization unit 100. At this point, an excessive amount of HCl is contained in the exhaust gas having passed through the reduction denitration unit 60, but is never discharged from a stack, since HCl is absorbed by an alkaline aqueous solution such as lime milk in the desulfurization unit 100. Together with the above-described method, a system is proposed in which a chlorinating agent such as HCl is sprayed at an upstream of a denitration catalyst to oxidize (chlorinate) mercury on the catalyst, and then the mercury is removed in a wet desulfurization unit located at a downstream (see, for example, Patent Literature 1).

Patent Literature 1: JP-A Hei 10-230137

DISCLOSURE OF THE INVENTION

Problems to be Solved by the Invention

However, in a case of a coal with a low Cl content, a large amount of a mercury-chlorinating agent such as HCl needs to be supplied into exhaust gas to maintain the rate of conversion to mercury chloride. Moreover, in order to vaporize HCl, a large amount of a high-temperature heat source, steam, or the like is needed. Furthermore, in addition to $NH_3$, which is considered hazardous in power plants, highly corrosive HCl is used, which induces material corrosion, thereby presenting problems of increased utility and storage costs.

Accordingly, an object of the present invention is to provide a method and an apparatus for treating exhaust gas which are capable of reducing the amount of a highly corrosive mercury-halogenating agent such as a mercury-chlorinating agent to be added in an exhaust gas treatment with the mercury-removing efficiency kept high.

In order to achieve the above object, according to the present invention, a catalyst for treating exhaust gas in which nitrogen oxide in the exhaust gas is removed upon contact with ammonia serving as a reducing agent, and in which mercury is oxidized using a halogen as an oxidant includes: $TiO_2$ as a support; an oxide of at least one selected from the group consisting of V, W and Mo, which is supported as an active component on the support; and at least one selected from the group consisting of Bi, P, and compounds containing Bi and/or P, which is supported as a co-catalyst component on the support. The halogen as the oxidant for mercury is preferably a compound containing chlorine (Cl) such as $NH_4Cl$ besides HCl or a compound containing bromine (Br). Moreover, the co-catalyst component can be used in forms as follows.

(a) in a form of only a Bi element.
(b) in a form of only a P element.
(c) in a form of containing both a Bi element and a P element.
(d) in a form of a compound of Bi and P.
(e) in a form of a compound containing Bi.
(f) in a form of a compound containing P.
(g) in a form of a compound containing Bi and P.

According to another aspect of the present invention, in the catalyst for treating exhaust gas, the co-catalyst component is formed of any one of P and a compound containing P.

According to yet another aspect of the present invention, in the catalyst for treating exhaust gas, the co-catalyst component is formed of any one of Bi and a compound containing Bi.

Effects of the Invention

The present invention provides a catalyst for treating exhaust gas capable of reducing the amount of a highly corrosive mercury-chlorinating agent to be added while keeping the mercury oxidation efficiency high in an exhaust gas treatment.

Figure 1:
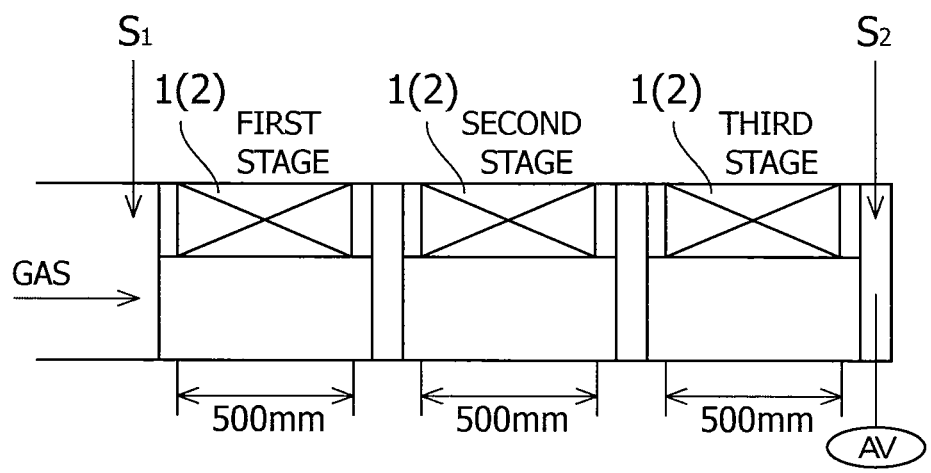
FIG. 1 is a conceptual diagram for describing arrangement of catalysts for treating exhaust gas in Examples 1 and 2.

| EXPLANATION OF REFERENCE NUMERALS | |
|---|---|
| 1 | Catalyst for treating exhaust gas |
| 21 | HCl injection spot |
| 40 | Mercury-chlorinating-agent tank |
| 60 | Reduction denitration unit |
| 70 | Air heater |

-continued

| | EXPLANATION OF REFERENCE NUMERALS | |
|---|---|---|
| 80 | Heat exchanger | |
| 90 | Dust collector | |
| 100 | Desulfurization unit | |

BEST MODE FOR CARRYING OUT THE INVENTION

Hereinafter, a catalyst for treating exhaust gas according to the present invention will be described in further details with reference to an embodiment thereof.

A support of the catalyst for treating exhaust gas according to the present invention is formed of $TiO_2$. As the catalyst support, generally, at least one selected from the group consisting of $TiO_2$, $SiO_2$, $ZrO_2$, $Al_2O_3$, complex oxides thereof, and zeolite can be used.

Moreover, the catalyst for treating exhaust gas according to the present invention supports an oxide of at least one selected from the group consisting of V, W and Mo as an active component on such a support.

Furthermore, the catalyst for treating exhaust gas according to the present invention supports at least one selected from the group consisting of Bi, P, and compounds containing Bi and/or P as a co-catalyst component on the support. The co-catalyst component exists preferably in the form of an oxide, complex oxide or heteropoly acid. Since the compound containing Bi or P is in the form of a compound having a different oxidation number, the oxidation of mercury can be promoted owing to the effect of the oxidation-reduction cycle. Bi can form a complex oxide with Mo, and thus functions as a co-catalyst. Meanwhile, P can form a heteropoly acid having a considerably strong oxidizing power by combining with Mo or W. Both Bi and P do not exist independently and they are an element that can form a compound. Thus, Bi and P function as a co-catalyst.

The compounding ratio of the co-catalyst component with respect to the active component is as follows.

For example, suppose a case where V oxide is used as the active component and a heteropoly acid containing P (molybdophosphoric acid) is used as the co-catalyst component. In this case, the ratio of the number of V atoms contained, the number of Mo atoms contained and the number of P atoms contained is preferably 32:12:1 to 10:12:1.

As another example, suppose a case where V oxide is used as the active component and a compound containing Bi is used as the co-catalyst component. In this case, the ratio of the number of V atoms contained, the number of Mo atoms contained and the number of Bi atoms contained is preferably 1:3:0.1 to 1:10:1.5.

In the above cases, preferably 0.1 to 2 mass % of the active component is supported per 100 g of the support.

Schematically, the catalyst for treating exhaust gas according to the present invention is produced as follows.
(1) For example, a catalyst paste containing a support component and an active component is molded into a honeycomb shape and fired.
(2) The honeycomb is impregnated with a co-catalyst component and fired.

A specific mode of preparing $Bi_2O_3(1.5)$-$MoO_3(7)$-$V_2O_5$/$TiO_2$ will be described in Example 1 below.

A specific mode of preparing P—$MoO_3(7)$-$V_2O_5(0.5)$/$TiO_2$ will be described in Example 2 below.

EXAMPLE 1

Preparation of $Bi_2O_3(1.5)$-$MoO_3(7)$-$V_2O_5$/$TiO_2$

A $TiO_2$-$V_2O_5$-based denitration catalyst ($TiO_2$:$V_2O_5$=95.5:0.5 (mass ratio)) was prepared as follows.

Ammonia water with a $NH_3$ content of 25% was added to 3600 g of a metatitanic acid slurry ($TiO_2$ content: 30 mass %), and the pH was adjusted to 6.5, followed by wet-kneading for 2 hours, drying, and furthermore firing at 550° C. for 5 hours. Thereby, a titanium oxide powder was obtained. To the powder, an ammonium metavanadate aqueous solution and an ammonium molybdate aqueous solution were added so as to make the $V_2O_5$ and $MoO_3$ contents be 0.5 mass % and 7 mass %, respectively, and then were sufficiently mixed with the powder. Thereafter, the mixture was dried and fired at 450° C. for 4 hours. Thereby, a powder (A) formed of titanium oxide [$TiO_2$]-vanadium oxide [$V_2O_5$]-molybdenum oxide [$MoO_3$] was obtained. To 1000 g of the powder (A), 25 g of carboxymethyl cellulose and 12.5 g of polyethylene oxide were put and kneaded together in a kneader for 30 minutes with an adequate amount of water being added thereto, followed by extrusion into a honeycomb shape with 30 $mm^2$, drying and then firing at 500° C. for 5 hours. A bismuth nitrate aqueous solution was further prepared, and the honeycomb was impregnated therewith so as to make the $Bi_2O_3$ content be 1.5 mass %. The resultant was fired at 500° C. for 3 hours. Thus, a $Bi_2O_3(1.5)$-$MoO_3(7)$-$V_2O_5$/$TiO_2$ catalyst was prepared.

[Test for Mercury Oxidation Activity]

The honeycomb-shaped catalysts 1 for treating exhaust gas prepared as described above were provided at three stages, each catalyst having 4 conduits×7 conduits in 500-mm length as shown in FIG. 1, and a test was carried out for the mercury oxidation activity.

Exhaust gas samples having the following $O_2$ to $NO_x$ features shown in Table 1 were allowed to flow under the conditions in the same Table 1, and the mercury oxidation activity of the catalyst 1 for treating exhaust gas was tested. Note that symbols in the table represent the following meanings.

Ugs: superficial velocity

AV: the amount of gas to be treated based on gas-contact area

The exhaust gas samples were extracted at positions $S_1$ and $S_2$ in FIG. 1.

TABLE 1

| Gas Amount | $m^3N/hr$ | 8.49 |
|---|---|---|
| Temperature | ° C. | 400 |
| Ugs | mN/S | 2.30 |
| $NH_3/NO_x$ | — | 0.9 |
| AV | $m^3N/m^2hr$ | 11.96 |
| $O_2$ | % | 4.0 |
| $H_2O$ | % | 12.0 |
| Hg | $\mu g/m^3N$ | 20 |
| HCl | ppm | 50 |
| $SO_x$ | ppm | 1000 |
| $NO_x$ | ppm | 350 |

Table 2 shows the test result. As seen from the result in Table 2, it is understood that, by using the catalyst 1 for treating exhaust gas according to the present invention, 79.8% of mercury was oxidized after passing through the three stages.

TABLE 2

| Sampled Position | AV m³N/m²hr | NO$_x$ ppm | NH$_3$ ppm | HCl ppm | Hg(2+) μg/m³N | Hg(0) μg/m³N | Total Hg μg/m³N | Hg(2+) Proportion % | Notes |
|---|---|---|---|---|---|---|---|---|---|
| S1 | Inlet | 351 | 315 | 50.1 | 6.9 | 13.1 | 20.0 | 34.5 | Humidity: 12.1% |
| S2 | 16.0 | 48.8 | 13.1 | — | 17.4 | 4.4 | 21.8 | 79.8 | Oxygen Concentration: 4.0 vol % |

EXAMPLE 2

Preparation of P—MoO$_3$(7)-V$_2$O$_5$(0.5)/TiO$_2$

A TiO$_2$-V$_2$O$_5$-based denitration catalyst (TiO$_2$:V$_2$O$_5$=95.5:0.5 (mass ratio)) was prepared as follows.

Ammonia water with a NH$_3$ content of 25% was added to 3600 g of a metatitanic acid slurry (TiO$_2$ content: 30 mass %), and the pH was adjusted to 6.5, followed by wet-kneading for 2 hours, drying, and furthermore firing at 550° C. for 5 hours. Thereby, a titanium oxide powder was obtained. To the powder, an ammonium metavanadate aqueous solution was added so as to make the V$_2$O$_5$ content be 0.5 mass %, and then was sufficiently mixed with the powder. Thereafter, the mixture was dried and fired at 450° C. for 4 hours. Thereby, a powder (A) formed of titanium oxide [TiO$_2$]-vanadium oxide [V$_2$O$_5$] was obtained. To 1000 g of the powder (A), 25 g of carboxymethyl cellulose and 12.5 g of polyethylene oxide were put and kneaded together in a kneader for 30 minutes with an adequate amount of water being added thereto, followed by extrusion into a honeycomb shape with 30 mm², drying and then firing at 500° C. for 5 hours. A phosphomolybdic acid aqueous solution was further prepared, and the honeycomb was impregnated therewith so as to make the MoO$_3$ content be 7 mass %. The resultant was fired at 500° C. for 3 hours. Thus, a P—MoO$_3$(7)-V$_2$O$_5$(0.5)/TiO$_2$ catalyst was prepared.

[Test for Mercury Oxidation Activity]

As in the case of Example 1, the honeycomb-shaped catalysts 2 for treating exhaust gas prepared as described above were provided at three stages, each catalyst having 4 conduits×7 conduits in 500-mm length as shown in FIG. 1, and a test was carried out for the mercury oxidation activity.

Exhaust gas samples having the same O$_2$ to NO$_x$ features as those shown in Table 1 were allowed to flow under the conditions in Table 3, and the mercury oxidation activity of the catalyst 2 for treating exhaust gas was tested.

TABLE 3

| Gas Amount | m³N/hr | 8.49 |
|---|---|---|
| Temperature | ° C. | 400 |
| Ugs | mN/S | 2.30 |
| NH$_3$/NO$_x$ | — | 0.9 |
| AV | m³N/m²hr | 11.96 |
| O$_2$ | % | 4.0 |
| H$_2$O | % | 12.0 |
| Hg | μg/m³N | 20 |
| HCl | ppm | 50 |
| SO$_x$ | ppm | 1000 |
| NO$_x$ | ppm | 350 |

Table 4 shows the test result. As seen from the result in Table 4, it is understood that, by using the catalyst 2 for treating exhaust gas according to the present invention, 89.1% of mercury was oxidized after passing through the three stages.

TABLE 4

| Sampled Position | AV m³N/m²hr | NO$_x$ ppm | NH$_3$ ppm | HCl ppm | Hg(2+) μg/m³N | Hg(0) μg/m³N | Total Hg μg/m³N | Hg(2+) Proportion % | Notes |
|---|---|---|---|---|---|---|---|---|---|
| S1 | Inlet | 353 | 319 | 51.5 | 6.3 | 12.9 | 19.2 | 32.8 | Humidity: 12.1% |
| S2 | 16.0 | 38.0 | 4.4 | — | 18.8 | 2.3 | 21.1 | 89.1 | Oxygen Concentration: 4.0 vol % |

COMPARATIVE EXAMPLE

Preparation of MoO$_3$(7)-V$_2$O$_5$(0.5)/TiO$_2$

A TiO$_2$-V$_2$O$_5$-based denitration catalyst (TiO$_2$:V$_2$O$_5$=95.5:0.5 (mass ratio)) was prepared as follows.

Ammonia water with a NH$_3$ content of 25% was added to 3600 g of a metatitanic acid slurry (TiO$_2$ content: 30 mass %), and the pH was adjusted to 6.5, followed by wet-kneading for 2 hours, drying, and furthermore firing at 550° C. for 5 hours. Thereby, a titanium oxide powder was obtained. To the powder, an ammonium metavanadate aqueous solution and an ammonium molybdate aqueous solution were added so as to make the V$_2$O$_5$ and MoO$_3$ contents be 0.5 mass % and 7 mass %, respectively, and then where sufficiently mixed with the powder. Thereafter, the mixture was dried and fired at 450° C. for 4 hours. Thereby, a powder (A) formed of titanium oxide [TiO$_2$]-vanadium oxide [V$_2$O$_5$]-molybdenum oxide [MoO$_3$] was obtained. To 1000 g of the powder (A), 25 g of carboxymethyl cellulose and 12.5 g of polyethylene oxide were put and kneaded together in a kneader for 30 minutes with an adequate amount of water being added thereto, followed by extrusion into a honeycomb shape with 30 mm², drying and then firing at 500° C. for 5 hours. Thus, a MoO$_3$(7)-V$_2$O$_5$/TiO$_2$ catalyst of Comparative Example was prepared.

[Test for Mercury Oxidation Activity]

As in the case of Example 1, the comparative honeycomb-shaped catalysts for treating exhaust gas prepared as described above were provided at three stages, each catalyst having 4 conduits×7 conduits in 500-mm length as shown in FIG. 1, and a test was carried out for the mercury oxidation activity.

Exhaust gas samples having the same O$_2$ to NO$_x$ features as those shown in Table 1 were allowed to flow, and the mercury oxidation activity of the comparative catalyst for treating exhaust gas was tested.

Table 5 shows the test result. As seen from the result in Table 5, it is understood that, by using the comparative catalyst for treating exhaust gas according to the present invention, 79.5% of mercury was oxidized after passing through the three stages.

TABLE 5

| Sampled Position | AV $m^3N/m^2hr$ | $NO_x$ ppm | $NH_3$ ppm | HCl ppm | Hg(2+) $\mu g/m^3N$ | Hg(0) $\mu g/m^3N$ | Total Hg $\mu g/m^3N$ | Hg(2+) Proportion % | Notes |
|---|---|---|---|---|---|---|---|---|---|
| S1 | Inlet | 349 | 320 | 50.2 | 6.9 | 13.0 | 19.9 | 34.7 | Humidity: 12.1% |
| S2 | 16.0 | 36.9 | 7.5 | — | 15.9 | 4.1 | 20.0 | 79.5 | Oxygen Concentration: 4.0 vol % |

INDUSTRIAL APPLICABILITY

As seen from the results of Example 1, Example 2 and Comparative Example, by using a catalyst for treating exhaust gas according to the present invention, the amount of a highly corrosive mercury-chlorinating agent to be added can be reduced with the mercury oxidation efficiency kept high.

When the catalyst for treating exhaust gas according to the present invention is used, only an addition of a considerably small amount of mercury oxidant suffices for an HCl/HBr spray unit or an $NH_4Cl$ supply unit for oxidizing mercury. For this reason, flue corrosion due to highly corrosive HCl can be reduced.

Moreover, when exhaust gas contains several tens ppm of HCl originating from coal, it is not necessary to install an HCl spray unit. In that case, the facility cost for safety control measure of HCl requiring care in handling can be greatly reduced.

Figure 2:
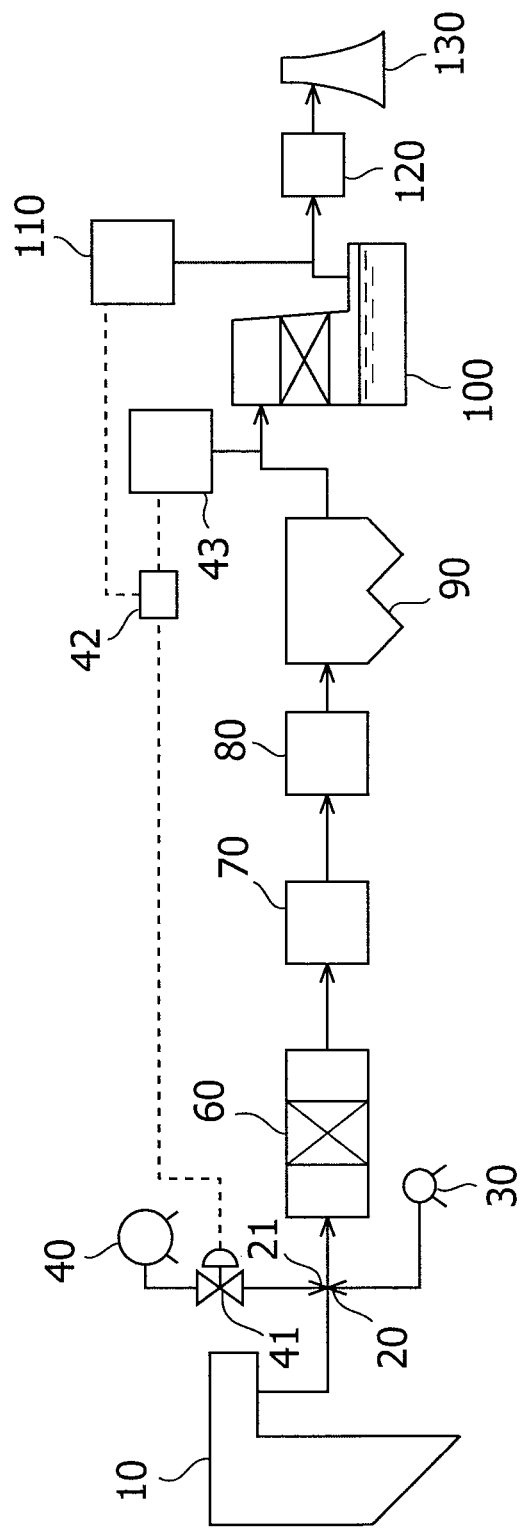
FIG. 2 is a conceptual diagram for describing a conventional method for treating exhaust gas.

Therefore, the catalyst for treating exhaust gas according to the present invention can be used in the method for treating exhaust gas described in FIG. 2.

The invention claimed is:

1. A catalyst for treating exhaust gas in which nitrogen oxide in the exhaust gas is removed upon contact with ammonia serving as a reducing agent, and in which mercury is oxidized using a halogen as an oxidant, the catalyst obtained by a method comprising the steps of:
impregnating a honeycomb catalyst with a co-catalyst in an aqueous solution comprising the co-catalyst, and
firing the resultant product;
wherein:
the honeycomb catalyst comprises an oxide of at least one selected from the group consisting of V, W and Mo, which is supported as an active component on $TiO_2$ as a support; and
the co-catalyst is at least one selected from the group consisting of Bi, P, and compounds containing Bi and/or P.

2. The catalyst for treating exhaust gas according to claim 1, wherein the co-catalyst component is formed of any one of P and a compound containing P.

3. The catalyst for treating exhaust gas according to claim 1, wherein the co-catalyst component is formed of any one of Bi and a compound containing Bi.

4. A catalyst for treating exhaust gas in which nitrogen oxide in the exhaust gas is removed upon contact with ammonia serving as a reducing agent, and in which mercury is oxidized using a halogen as an oxidant, the catalyst obtained by a method comprising the steps of:
impregnating a honeycomb catalyst with a co-catalyst in an aqueous solution comprising the co-catalyst, and
firing the resultant product;
wherein:
the honeycomb catalyst comprises an oxide of at least one selected from the group consisting of V, W and Mo, which is supported as an active component on $TiO_2$ as a support, and
the co-catalyst is at least one selected from the group consisting of Bi, P—Mo, and compounds containing Bi and/or P—Mo.

* * * * *